(12) United States Patent
Kwon

(10) Patent No.: US 7,855,985 B2
(45) Date of Patent: Dec. 21, 2010

(54) WIRELESS NETWORK SYSTEM AND METHOD OF TRANSMITTING OR RECEIVING DATA OVER WIRELESS NETWORK

(75) Inventor: Chang-yeul Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 11/945,794

(22) Filed: Nov. 27, 2007

(65) Prior Publication Data

US 2008/0130507 A1 Jun. 5, 2008

Related U.S. Application Data

(60) Provisional application No. 60/861,960, filed on Dec. 1, 2006.

(30) Foreign Application Priority Data

Jul. 6, 2007 (KR) ............... 10-2007-0068173

(51) Int. Cl.
*H04B 7/00* (2006.01)
(52) U.S. Cl. .................................... 370/310
(58) Field of Classification Search ................ 370/310, 370/338, 431, 443, 458, 462; 709/223–226, 709/249

See application file for complete search history.

(56) References Cited

U.S. PATENT DOCUMENTS

| 7,280,518 | B2 * | 10/2007 | Montano et al. | ............. 370/338 |
| 7,460,555 | B2 * | 12/2008 | Yamaguchi et al. | ......... 370/447 |
| 7,561,525 | B2 * | 7/2009 | Saito | ............ 370/237 |
| 2003/0152059 | A1 * | 8/2003 | Odman | ............ 370/338 |
| 2005/0013267 | A1 | 1/2005 | An | |
| 2005/0089045 | A1 | 4/2005 | Shim et al. | |
| 2005/0089058 | A1 | 4/2005 | Hong et al. | |
| 2005/0193116 | A1 * | 9/2005 | Ayyagari et al. | ............ 709/226 |

(Continued)

FOREIGN PATENT DOCUMENTS

KR   10-2005-0028737 A   3/2005

(Continued)

OTHER PUBLICATIONS 802.15.3 IEEE standard, Part 15.3, IEEE, Sep. 2003, pp. 1-324.*

*Primary Examiner*—Dmitry H Levitan
(74) *Attorney, Agent, or Firm*—Sughrue Mion, PLLC

(57) ABSTRACT

A wireless network system and a method of transmitting or receiving data over a wireless network capable of limiting transmission or reception of request packets by stations existing on the wireless network, where directional communication is performed in a high-frequency bandwidth, while a wireless network coordinator is being changed or while the wireless network coordinator is in a busy state. The wireless network coordinator includes a frame generation unit which generates a beacon frame for forming a superframe; a management unit which determines a state of a network and a wireless network station on the network, and inserts a result of the determination in the beacon frame, wherein the management unit sets a field of the beacon frame which indicates whether an accepting command which is transmitted by a station on or participating in the network can be received; and a communication unit which transmits the beacon frame.

18 Claims, 10 Drawing Sheets

U.S. PATENT DOCUMENTS

| | | | |
|---|---|---|---|
| 2007/0165589 A1* | 7/2007 | Sakoda | 370/345 |
| 2007/0248072 A1 | 10/2007 | Kwon et al. | |
| 2009/0067389 A1* | 3/2009 | Lee et al. | 370/336 |

FOREIGN PATENT DOCUMENTS

| | | |
|---|---|---|
| KR | 10-2005-0102702 A | 10/2005 |
| KR | 10-2006-0003560 A | 1/2006 |
| KR | 10-2006-0059003 A | 6/2006 |
| KR | 10-0791300 B1 | 1/2008 |

\* cited by examiner

WIRELESS NETWORK SYSTEM AND METHOD OF TRANSMITTING OR RECEIVING DATA OVER WIRELESS NETWORK

This application claims priority from U.S. Provisional Patent Application No. 60/861,960 filed on Dec. 1, 2006 in the United States Patent and Trademark Office, and Korean Patent Application No. 10-2007-0068173 filed on Jul. 6, 2007 in the Korean Intellectual Property Office, the disclosures of which are incorporated herein by reference in their entirety.

BACKGROUND OF THE INVENTION

1. Field of the Invention

Methods and apparatuses consistent with the present invention relate to a wireless network system and a method of transmitting or receiving data over a wireless network, and more particularly, to a wireless network system and a method capable of limiting the transmission or reception of request packets by stations existing on the wireless network, where directional communication is performed in a high-frequency bandwidth, while a wireless network coordinator is being changed or while the wireless network coordinator is in a busy state.

2. Description of the Related Art

FIG. 1 illustrates a conventional superframe 100. The conventional superframe 100 sequentially includes a beacon period 110, a contention access period (CAP) 120, and a channel time allocation period (CTAP) 130. During the CAP 120, asynchronous data or control commands are transmitted or received. The CTAP 130 is composed of channel time allocations (CTA's) 132 and management CTA's (MCTA's) 131. The CTA's 132 are used to transmit or receive control commands, isochronous data, and asynchronous data.

The length of the CAP 120 is determined by an access point (AP) and is communicated to stations, which exist on a network, using a beacon frame broadcast during the beacon period 110.

The CAP 120 uses a carrier sense multiple access with collision avoidance (CSMA/CA) method as a media access method. On the other hand, the CTAP 130 uses a time division multiple access (TDMA) method in which each station has a specified time window. The AP allocates a channel time for a device requesting media access and exchanges data with a corresponding station during the allocated channel time. Here, the MCTA's 131 are either allocated to a pair of stations, which desire to exchange data with each other and use the TDMA method for access, or they are shared CTA's using a slotted aloha protocol.

Presently, a method of transmitting compressed data using a bandwidth of several gigahertz and a method of transmitting uncompressed data using a frequency bandwidth of several tens of gigahertz are being developed. However, since uncompressed data is larger than compressed data, it can be transmitted only in a frequency bandwidth of several tens of gigahertz. In addition, even when having packet loss, uncompressed audiovisual data is less affected by the packet loss than the compressed data in terms of display quality.

Therefore, in order to transmit or receive data in such a high frequency bandwidth, each station may transmit a request packet to a coordinator requesting the coordinator to allocate a frequency bandwidth and approve its participation in a network. However, if a station transmits a request packet to the coordinator while network management authority is being handed over from a network coordinator to a new network coordinator, a new coordinator may fail to receive the request packet. Similarly, a coordinator in a busy state may be unable to service the request packet and may fail to receive the request packet. Accordingly, the station which transmitted the request packet cannot receive a response packet from the new coordinator, or the busy coordinator, and has to retransmit the request packet, thereby causing a loss of a communication bandwidth.

In this regard, an invention is required that can prevent a loss of a communication frequency bandwidth by limiting the transmission or reception of request packets by stations while network management authority is being handed over from a network coordinator to a new network coordinator or while a network coordinator is in a busy state.

SUMMARY OF THE INVENTION

The present invention provides a wireless network system and a method of transmitting or receiving data over a wireless network. The system and method are capable of limiting the transmission or reception of request packets by stations existing on the wireless network, where directional communication is performed in a high-frequency bandwidth, while a network management authority is being handed over from a network coordinator to a new network coordinator or while the wireless network coordinator is in a busy state.

According to an aspect of the present invention, there is provided a wireless network coordinator including a frame generation unit which generates a beacon frame for forming a superframe; a management unit which determines a state of a network and a wireless network station on the network, and inserts a result of the determination in the beacon frame, wherein the management unit sets a field of the beacon frame which indicates whether an accepting command which is transmitted by a wireless network station on or participating in the network can be received; and a communication unit which transmits the beacon frame.

According to another aspect of the present invention, there is provided a method of forming a wireless network. The method includes generating a beacon frame for forming a superframe; determining a state of a network and a wireless network station on the network; inserting a result of the determination in the beacon frame, wherein the inserting the result of the determining includes setting a field of the beacon frame which indicates whether an accepting command which is transmitted by a wireless network station on or participating in the network can be received; and transmitting the beacon frame.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

Figure 1:
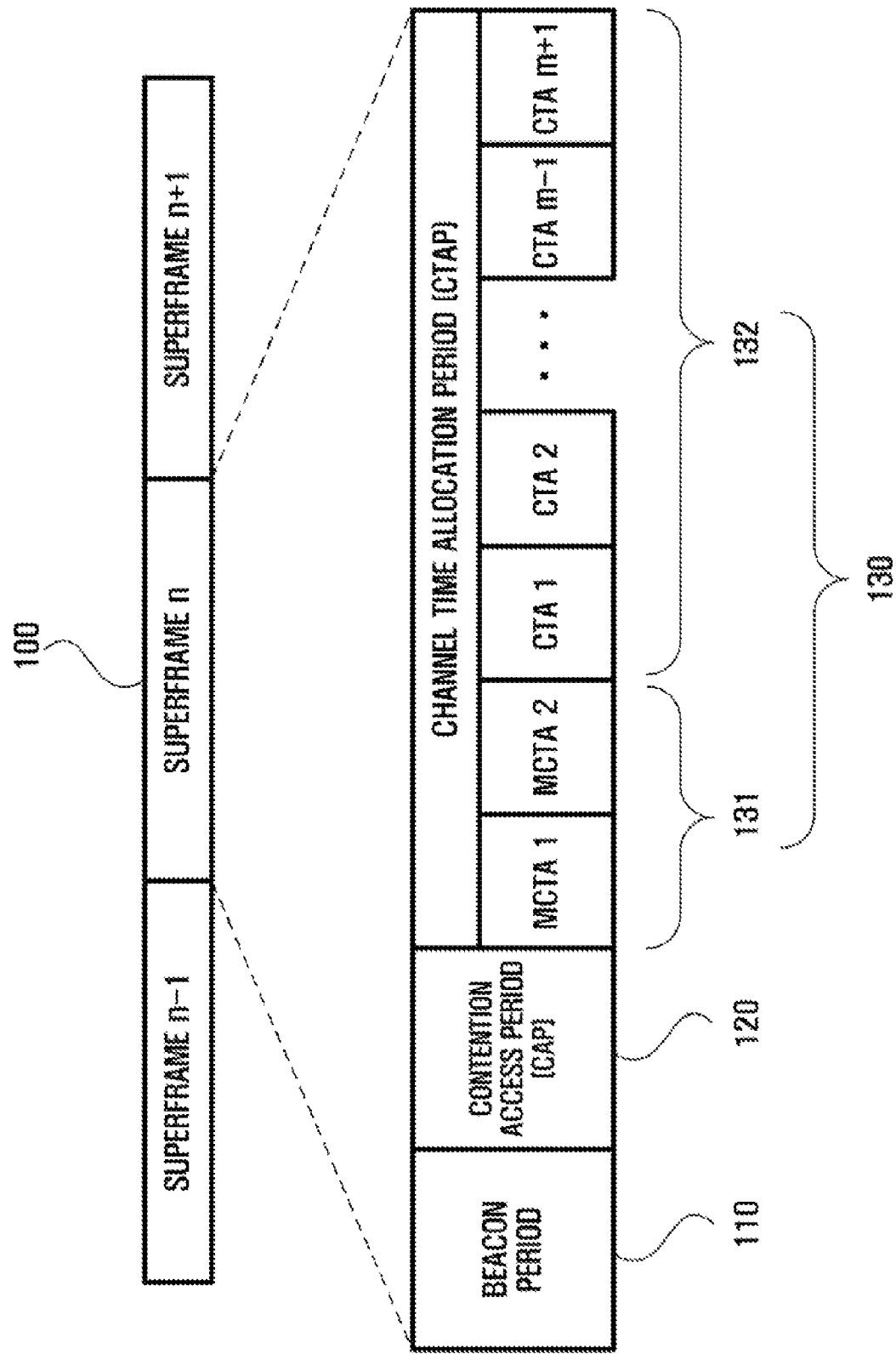
FIG. 1 illustrates a conventional superframe.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Like reference numerals in the drawings denote like elements, and thus their description will be omitted.

Hereinafter, exemplary embodiments of the present invention will be described in detail with reference to the accompanying drawings.

Figure 2:
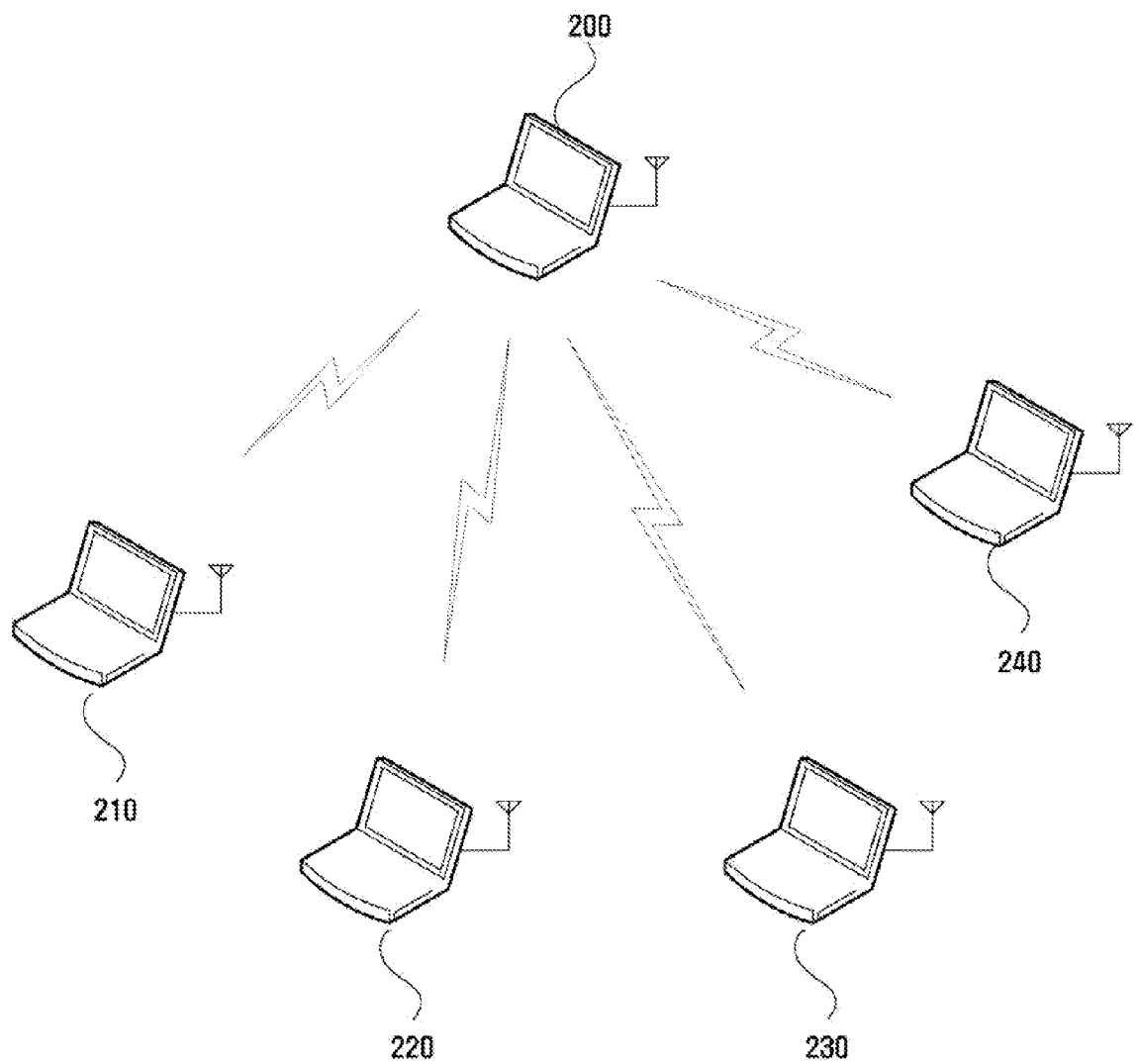
FIG. 2 illustrates a wireless network system according to an exemplary embodiment of the present invention.

FIG. 2 illustrates a wireless network system according to an exemplary embodiment of the present invention. Referring to FIG. 2, the wireless network system includes a wireless network coordinator 200 and a plurality of wireless network stations 210 through 240.

The wireless network coordinator 200 is a wireless network station authorized to manage a network. The wireless network coordinator 200 coordinates bandwidth allocation to the wireless network stations 210 through 240 by transmitting a beacon frame to the wireless network stations 210 through 240. That is, with reference to the received beacon frame, each of the wireless network stations 210 through 240, which form a network, stands by to be allocated a bandwidth, or if allocated a bandwidth transmits data to another wireless network station through the allocated bandwidth.

The network according to the present exemplary embodiment is formed using a superframe including one or more channel time blocks (CTB's). A CTB denotes a predetermined time period during which data is exchanged between wireless network stations existing on a network. The CTB's may be classified into reserved CTB's and unreserved CTB's. A reserved CTB is a reserved time period during which a bandwidth is allocated to a specified wireless network station on a network. On the other hand, an unreserved CTB is a time period during which a bandwidth is allocated to a wireless network station selected by contention from a plurality of wireless network stations on a network. The reserved CTB and the unreserved CTB correspond to a channel time allocation period (CTAP) and a contention access period (CAP), respectively.

Therefore, a station may transmit data through contention with other stations in an unreserved CTB or transmit data in a reserved CTB allocated thereto.

A superframe may include one or more reserved CTB's, and one of the reserved CTB's may be set as a time period (hereinafter, referred to as a reserved period) during which a packet (hereinafter, referred to as a bandwidth allocation packet) for bandwidth allocation in another reserved CTB is transmitted or received. Accordingly, a station which fails to be allocated a bandwidth through contention in an unreserved CTB or fails to be allocated a bandwidth of a reserved CTB can contend again with other stations for a bandwidth during the next reserved period.

A frequency bandwidth of a communication channel through which a beacon frame is transmitted or received and a frequency bandwidth of a communication channel used in an unreserved CTB include the 2.4 GHz or 5 GHz bandwidth, and a frequency bandwidth of a communication channel used in a reserved CTB includes the 60 GHz bandwidth.

In an unreserved CTB, the wireless network stations 210 through 240 may transmit or receive data or transmit bandwidth allocation packets on a contention basis. In addition, a wireless network station which newly participates in the network may transmit a packet to the wireless network coordinator 200 in order to request the wireless network coordinator 200 to approve its participation in the network. The wireless network coordinator 200, which receives such a request packet (a bandwidth allocation packet or a packet for request an approval for network participation), schedules CTB's of a superframe and transmits a beacon frame including scheduling information.

The wireless network coordinator 200 is a wireless network station selected from among the wireless network stations 210 through 240 on the network and is authorized to manage the network. The network management authority may be transferred between the wireless network stations 210 through 240. For example, if a wireless network station 210 through 240, which is serving as the wireless network coordinator 200, intends to withdraw from the network, the wireless network station 210 through 240 hands over the network management authority to another wireless network station 210 through 240 and then withdraws from the network. Accordingly, the wireless network station 210 through 240, which assumes the network management authority, begins to serve as the wireless network coordinator 200.

If a wireless network station 210 through 240 transmits a request packet during the handover of the network management authority, the wireless network station 210 through 240 which is newly serving as the wireless network coordinator 200 may fail to receive the request packet.

In addition, the wireless network station 210 through 240 newly serving as the wireless network coordinator 200 may not be able to respond to the request packet during the handover of the network management authority or while in a busy state.

In this regard, the wireless network coordinator 200 according to the present invention sets a predetermined flag in a beacon frame and broadcasts the beacon frame to the wireless network stations 210 through 240 so that no request packets are transmitted or received. The wireless network station newly serving as the network coordinator 200, or if the wireless network coordinator 200 acquires sufficient resources required to respond to the request packet, may reset the flag in order to allow request packets to be transmitted or received again.

Figure 3:
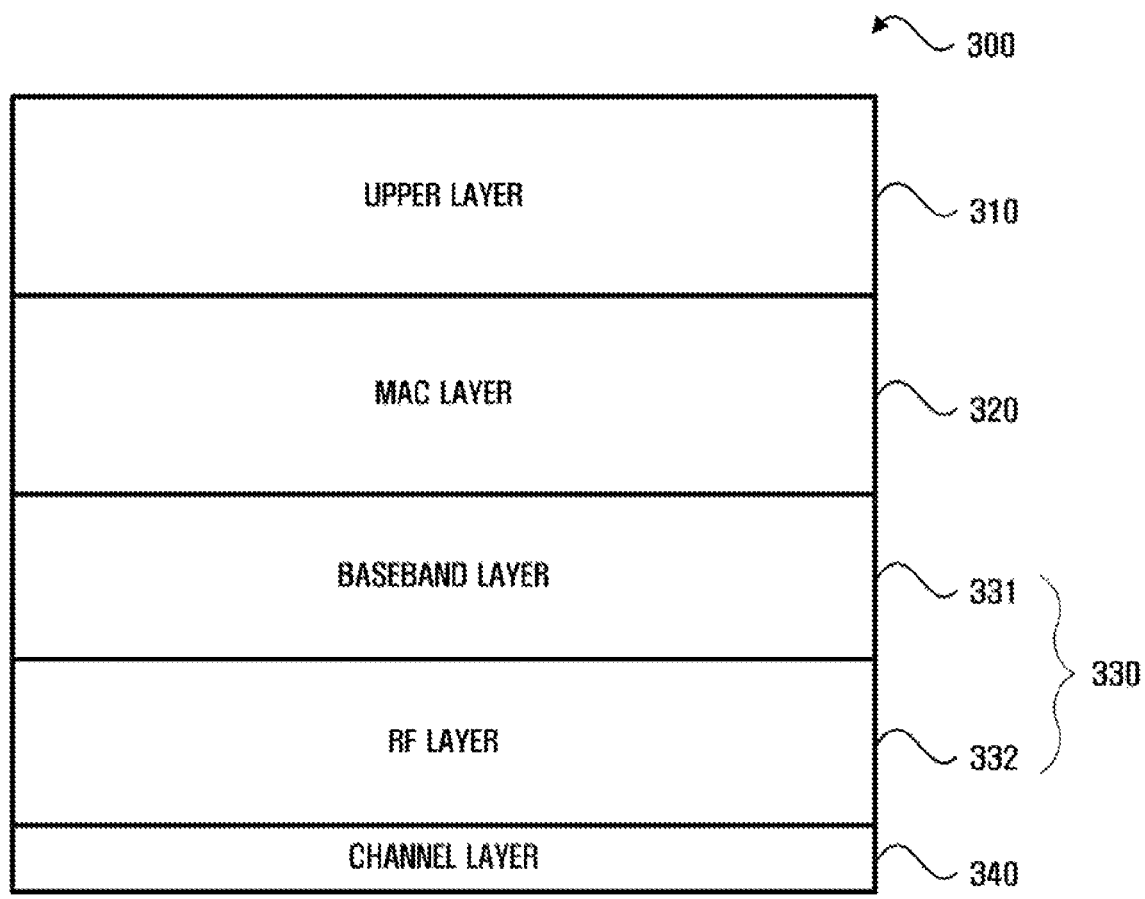
FIG. 3 illustrates a communication hierarchy according to an exemplary embodiment of the present invention.

FIG. 3 illustrates a communication hierarchy 300 according to an exemplary embodiment of the present invention. In general, the communication hierarchy 300 includes a channel layer 340, a physical layer 330, a media access control (MAC) layer 320, and an upper layer 310, respectively stacked from bottom to top. The channel layer 340 denotes a physical medium of a predetermined frequency bandwidth in which a radio signal is transmitted. The physical layer 330 includes a radio frequency (RF) layer 332 and a baseband layer 331. The upper layer 310 is higher than the MAC layer 320 and may include a logical link control (LLC) layer (not shown), a network layer (not shown), a transmission layer (not shown), an application layer (not shown) and the like.

A wireless channel according to an exemplary embodiment of the present invention may include not only a low-frequency bandwidth of 2.4 GHz or 5 GHz, but also a high-frequency bandwidth of 60 GHz. Accordingly, the channel layer 340 can perform unidirectional communication as well as omnidirectional communication.

Figure 4:
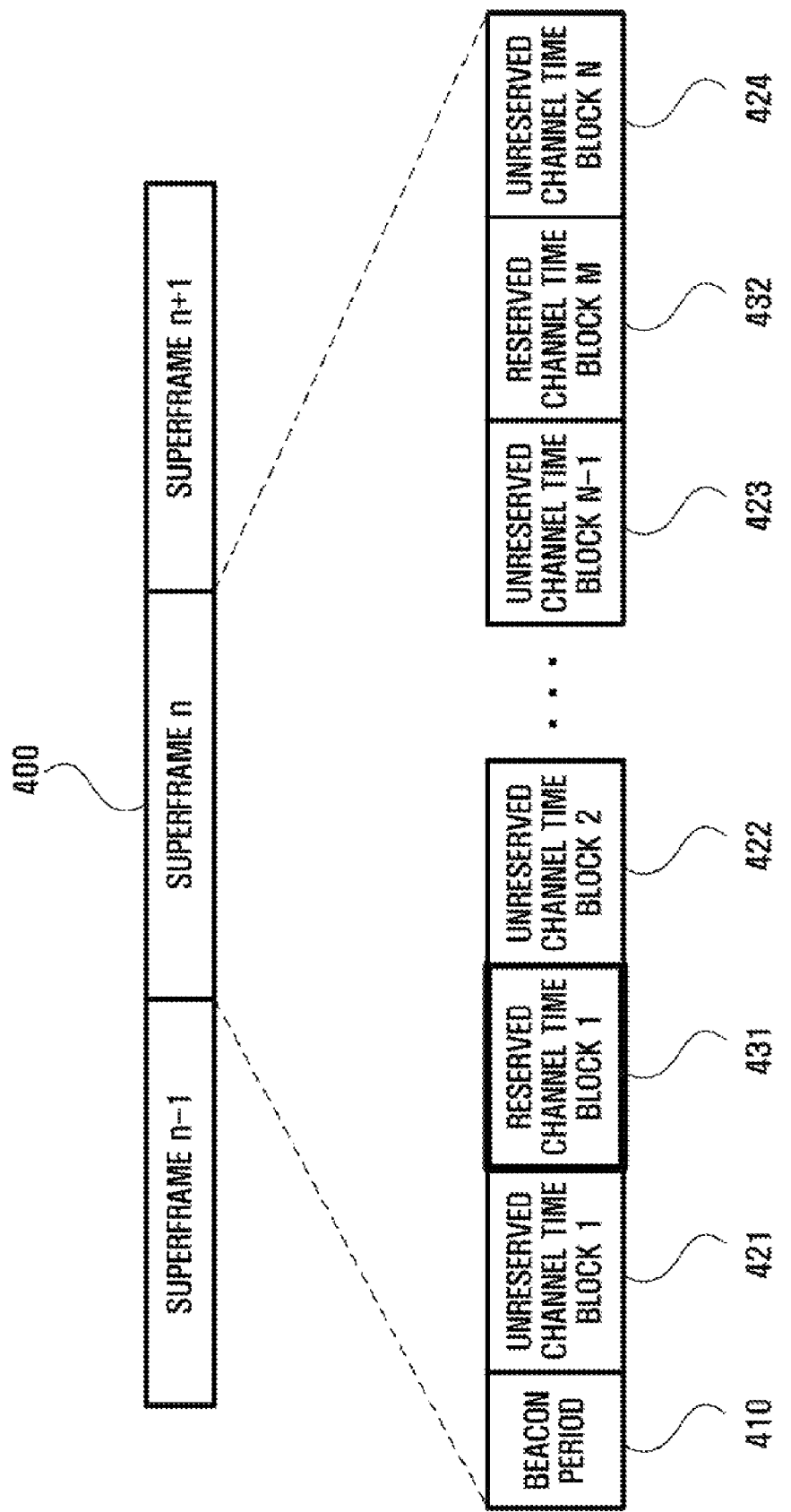
FIG. 4 illustrates a superframe according to an exemplary embodiment of the present invention.

FIG. 4 illustrates a superframe 400 according to an exemplary embodiment of the present invention. The superframe 400 includes a beacon period 410, unreserved CTB's 421 through 424, and reserved CTB's 431 and 432.

During the beacon period 410, a wireless network coordinator 200 broadcasts a beacon frame. Stations that receive the beacon frame and desire to transmit or receive data contend with one another for a bandwidth of a network with reference to the scheduling information included in the beacon frame.

Each of the unreserved CTB's 421 through 424 is a time period during which two or more wireless network stations contend with each other in order to transmit data. Therefore, only a wireless network station selected by contention can transmit data through a bandwidth allocated from an unreserved channel time block.

In each of the reserved CTB's 431 and 432, a bandwidth is allocated to a specified wireless network station. Therefore, only the wireless network station allocated the bandwidth can transmit data through a bandwidth allocated from a reserved channel time block.

Referring to FIG. 4, the superframe 400 may include the unreserved CTB's 421 through 424 and the reserved CTB's 431 and 432. In this case, one of the reserved CTB's 431 and 432, for example, the reserved CTB 431, may be set as a reserved period. That is, wireless network stations existing on a network contend with one another in order to be allocated a bandwidth in another reserved CTB. Here, the wireless network stations may contend with one another by transmitting or receiving bandwidth allocation packets to or from the wireless network coordinator.

Figure 5:
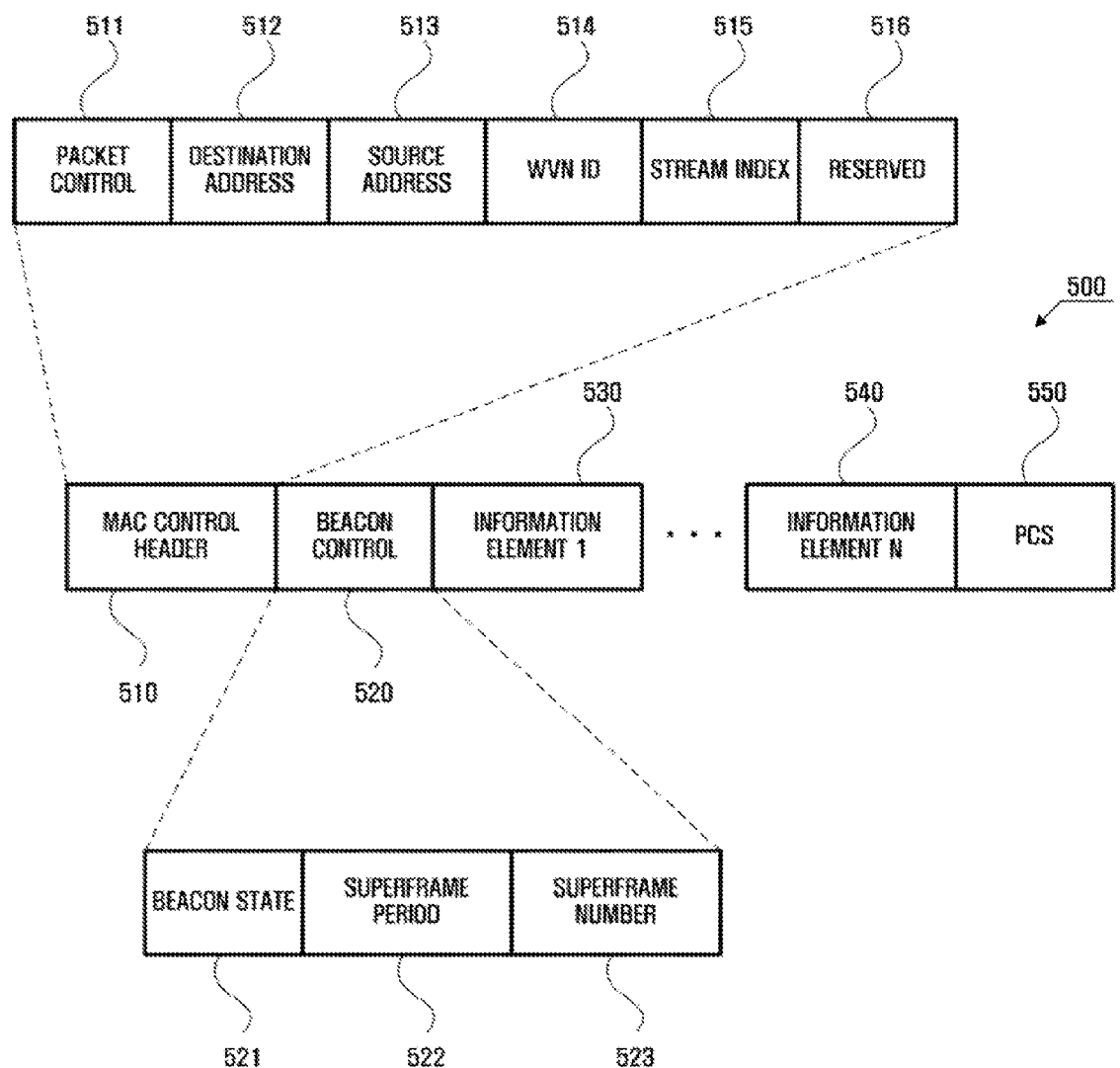
FIG. 5 illustrates a beacon frame according to an exemplary embodiment of the present invention.

FIG. 5 illustrates a beacon frame 500 according to an exemplary embodiment of the present invention. Referring to FIG. 5, the beacon frame 500 includes an MAC control header field 510, a beacon control field 520, information element fields 530 and 540, and a packet check sequence (PCS) field 550.

The MAC control header field 510 includes a packet control field 511, a destination address field 512, a source address field 513, a WVN (Wireless Video Network) ID field 514, a stream index field 515, and a reserved field 516.

The packet control field 511 includes a protocol version field (not shown), a packet class field (not shown), and an MAC field (not shown). The protocol version field specifies a modified version of a protocol used in a packet. The packet class field specifies the type of the packet. The MAC field specifies an acknowledgement (ACK) policy and presence of various headers.

An address of a wireless network station which is to receive the beacon frame 500 is entered into the destination address field 512, and an address of a wireless network coordinator is entered into the source address field 513.

In the present invention, the beacon frame 500 may be transmitted to all wireless network stations participating in a network. Therefore, a broadcast address may be entered into the destination address field 512.

The WVN ID field 514 specifies an identifier of a network formed by a wireless network coordinator and wireless network stations. The stream index field 515 specifies the type of data designated to be transmitted or received in a CTB. That is, the stream index field 515 may specify a value representing the type of data, such as asynchronous data, MAC commands traffic, bandwidth reservation traffic, an unassigned stream, or a quiet CTB for current channel assessment. For example, if the stream index field 515 specifies a value representing bandwidth reservation traffic, a CTB designated by a corresponding schedule block may be set as a reserved period.

The beacon control field 520 includes a beacon state field 521, a superframe period field 522, and a superframe number field 523. The beacon state field 521 includes a flag indicating whether a request packet can be transmitted. Based on the flag, wireless network stations on a network can determine whether to transmit request packets. A detailed description of the beacon state field 521 will made later with reference to FIG. 6.

The superframe period field 522 specifies a transmission interval of beacon frames, and the superframe number field 523 is used to synchronize wireless network stations with a wireless network coordinator during a schedule update, a sleep/wake update, or a change of a wireless network coordinator. A value of zero is entered into the superframe number field 523 when an initial beacon frame 500 is transmitted after a network is formed. Then, the value is increased by one whenever each superframe 400 is generated. Later, if the value reaches a preset threshold value, for example, 65535, it is reset to zero.

A beacon frame 500 may include schedule information including one or more schedule blocks (not shown). Information required to allocate a bandwidth of the network or operate the network may be included in each schedule block of the schedule information field (not shown) and communicated to the wireless network stations.

Each of the information element fields 530 and 540 includes an information element index field (not shown), a length field (not shown), and an information field (not shown).

The information element index field specifies a unique value of each information element, and the length field specifies a total length of the information field. Here, a unit of length may be an octet.

The information field may include one or more schedule blocks, and each schedule block includes a schedule information field (not shown), a stream index field (not shown), a start offset field (not shown), a time block period field (not shown), a schedule period field (not shown), and a time block number field (not shown).

The schedule information field includes a source identifier field (not shown), a destination identifier field (not shown), a static index field (not shown), a physical mode field (not shown), a directionality field (not shown), and a paired CTB field (not shown).

The source identifier field specifies an identifier of a wireless network station which is to transmit data. Therefore, the wireless network station having the identifier specified in the source identifier field can transmit data in a corresponding reserved CTB.

The destination identifier field specifies an identifier of a wireless network station which is to receive data. Therefore, the wireless network station having the identifier specified in the destination identifier field perceives that it is the destination of data distributed in a corresponding reserved CTB and thus receives the data.

The static index field specifies whether a corresponding schedule block is a static schedule. For example, the static index field specifies a schedule of a CTB existing in a specified time and a time period in a superframe. If a corresponding schedule block is a static schedule, a value of one may be entered in the static index field. If the schedule block is a dynamic schedule, a value of zero may be entered in the static index field.

The physical mode field specifies a frequency bandwidth method used to transmit or receive data. The frequency bandwidth method may be classified as a method of transmitting or receiving data using a frequency bandwidth of 60 GHz or a method of transmitting or receiving data using a frequency bandwidth of 2.4 GHz or 5 GHz. For example, if a corresponding schedule block uses a first frequency bandwidth method, a value of one may be entered in the physical mode field. If the schedule block uses a second frequency bandwidth method, a value of zero may be entered in the physical mode field.

The directionality field specifies directionality of transmission or reception. Directionality may be classified as unidirectional, indicating that data is transmitted or received in one direction in the form of a beam, or radial directional, indicating that data is transmitted or received in a radial direction. For example, if data is transmitted or received in one direction in the form of a beam, a value of one may be entered in the directionality field. If data is transmitted or received in a radial direction, a value of zero may be entered in the directionality field.

The paired CTB field specifies whether two wireless network stations can transmit data in one schedule period. For example, if a value of one is entered in the paired CTB field, two wireless network stations can alternately transmit data during a corresponding schedule period. If a value of zero is entered in the paired CTB field, only one wireless network station can transmit data.

The stream index field of each schedule block specifies the type of data which is designated to be transmitted or received in a CTB. The start offset field specifies a start time of a CTB in a superframe 400, and the time block period field specifies a length of each time block included in a schedule.

In addition, the schedule period field of each schedule block specifies an interval between start times of two successive time blocks included in one schedule. The time block number field specifies the number of time blocks allocated to a schedule included in one superframe 400.

A PCS input to the PCS field 550 of the beacon frame 500 is used by a wireless network station to test the integrity of a received packet. Here, the MAC control header 510 and all fields in the body of the beacon frame 500 are included in the PCS input. A wireless network station, which receives the beacon frame 500, compares a value obtained from a preset mathematical operation to the PCS and determines whether the beacon frame 500 has an error.

In a wireless network, a wireless network station, which receives a frame that passed an integrity test, has to transmit an ACK response frame to the wireless network station which transmitted the frame. If the wireless network station receiving the frame fails to transmit the ACK response frame, the wireless network station which transmitted the frame determines that the frame has an error or an error has occurred during transmission of the frame, and thus retransmits the frame.

Figure 6:
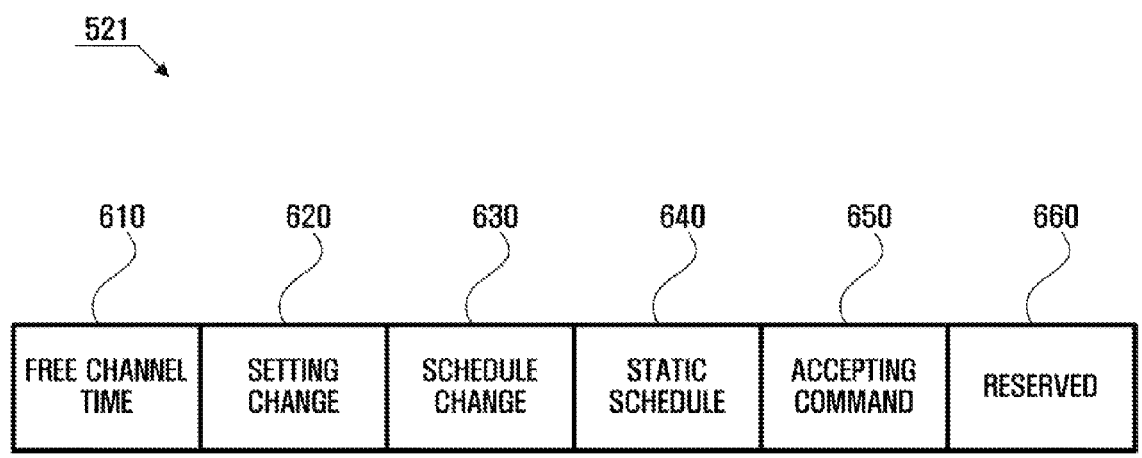
FIG. 6 illustrates a detailed view of a beacon state field of the beacon frame of FIG. 5.

FIG. 6 illustrates the beacon state field 521 of the beacon frame 500 of FIG. 5. Referring to FIG. 6, the beacon state field 521 includes a free channel time field 610, a setting change field 620, a schedule change field 630, a static schedule field 640, an accepting command field 650, and a reserved field 660.

A bit included in the free channel time field 610 indicates whether any CTB included in a superframe 400 is available to respond to a new bandwidth reservation request. For example, if the free channel time field 610 is set to zero, a new bandwidth reservation is not allowed. If the free channel time field 610 is set to one, the new bandwidth reservation is allowed.

A bit included in the setting change field 620 indicates whether the setting of a current beacon frame excluding a time stamp field is changed. For example, if no change is made, the bit is set to zero. Therefore, a wireless network station which receives the beacon frame 500 only has to decode a time stamp, and there is no need to parse all the information elements included in the beacon frame 500.

A bit included in the schedule change field 630 indicates whether there is a change in channel time scheduling of a current superframe 400 after comparison with a previous beacon frame 500. For example, if no change is made, the bit is set to zero. Therefore, there is no need for a wireless network station, which receives a beacon frame 500 to parse all schedule information elements included in the beacon frame 500.

A bit included in the static schedule field 640 indicates whether a static schedule information element is included in a current beacon frame 500. For example, if the bit is set to zero, the static schedule information element is not included in the current beacon frame 500. The static schedule information element may not be included in all beacon frames 500, but may be periodically included in beacon frames 500 in order to reduce the overhead of the beacon frames 500.

The accepting command field 650 is used to indicate whether a request command from a wireless network station on a network can be received. For example, if the accepting command field 650 bit is set to zero, the transmission of the request command is limited. On the other hand, if the accepting command field 650 bit is set to one, the transmission of the request command is allowed.

Thus, if a wireless network coordinator cannot respond to a request command because the handover of the network management authority is taking place or the wireless network coordinator is in a busy state, the wireless network coordinator may set the accepting command field 650 bit to zero so that wireless network stations do not transmit request commands. Here, the busy state refers to a state in which of the wireless network coordinator does not possess the resources required to respond to a request packet. The resources may include at least one of a central processing unit (CPU), a memory, and network resources.

Based on the value of the accepting command field 650, each wireless network station on a network may determine whether to transmit a request packet to the wireless network coordinator, such as a packet for requesting bandwidth allocation of a reserved CTB or a packet for requesting an approval for network participation.

Figure 7:
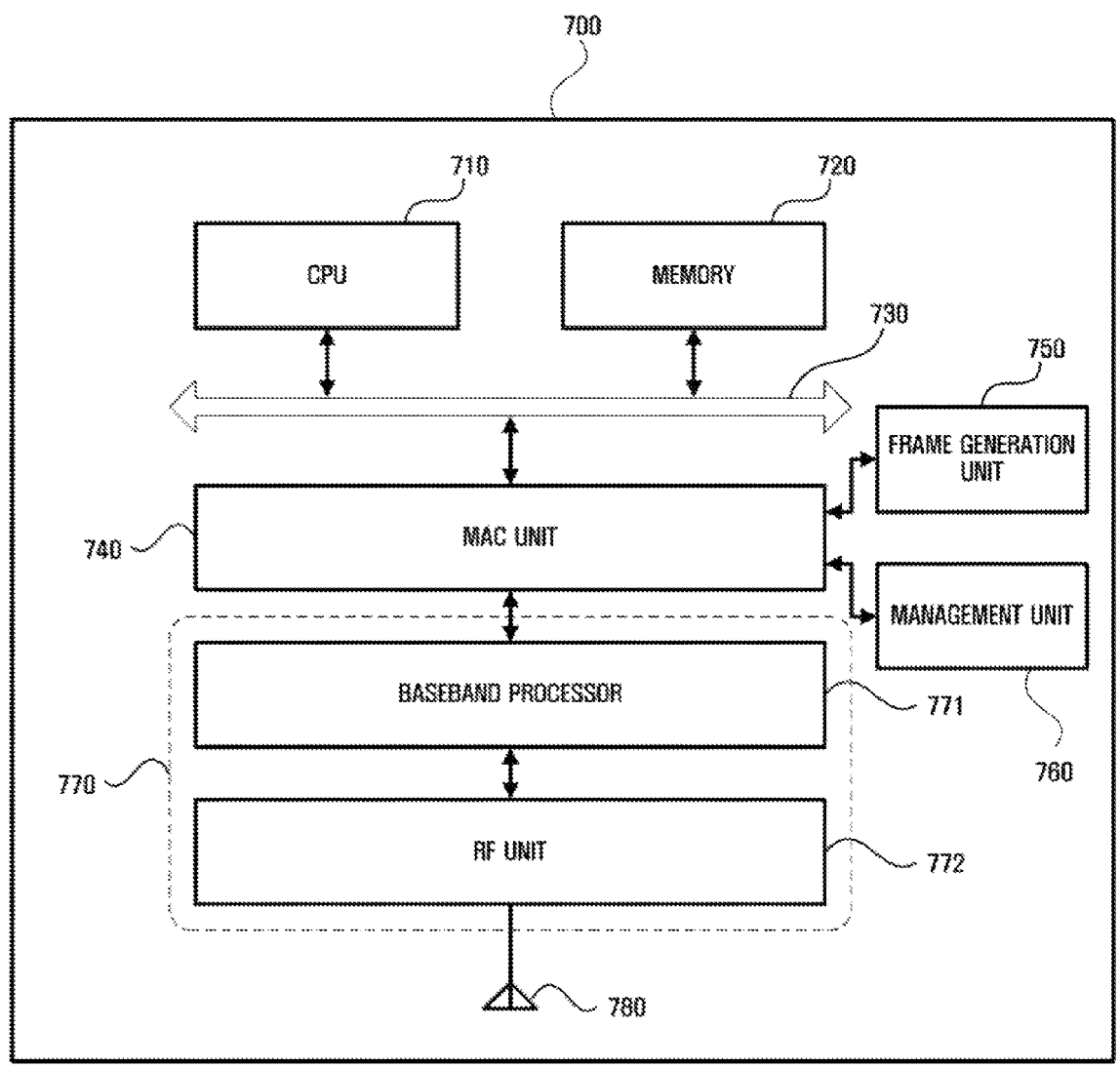
FIG. 7 is a block diagram of a wireless network coordinator according an exemplary embodiment of the present invention.

FIG. 7 is a block diagram of a wireless network coordinator 700 according an exemplary embodiment of the present invention. Referring to FIG. 7, the wireless network coordinator 700 includes a CPU 710, a memory 720, an MAC unit 740, a frame generation unit 750, a management unit 760, and a communication unit 770.

The CPU 710 controls other components connected to a bus 730 and is responsible for processing the upper layer 310 illustrated in FIG. 3. In addition, the CPU 710 processes reception data (a reception MAC service data unit (MSDU)) provided by the MAC unit 740, generates transmission data (a transmission MSDU), and transmits the generated transmission data to the MAC unit 740.

The memory 720 is a data storage module which can input or output information, such as a compact flash (CF) card, a secure digital (SD) card, a smart media (SM) card, a multimedia card (MMC), or a memory stick. The memory 720 may be included in the wireless network coordinator 700 or in a separate apparatus.

The frame generation unit 750 generates a beacon frame 500 for forming a superframe 400 that includes one or more CTB's. Here, the management unit 760 may set one of the CTB's as a period, or more particularly a reserved period, during which a packet for bandwidth allocation of a network is transmitted or received. To this end, the management unit 760 may insert reservation information into an information element of one of schedule blocks of schedule information. In FIG. 7, the frame generation unit 750 is implemented outside the MAC unit 740. However, the frame generation unit 750 may be implemented within the MAC unit 740.

The management unit 760 may determine whether a packet for bandwidth use on a network, which is formed in a superframe 400, can be transmitted or received, and based on the determination result, set a flag indicating whether the request packet for bandwidth use can be transmitted or received. In this case, the request packet may include at least one of a packet for requesting bandwidth allocation of a reserved CTB and a packet for requesting an approval for network participation. In order to indicate whether the request packet can be transmitted or received, a predetermined flag may be set in the beacon state field 521 of the beacon frame 500.

For example, while network management authority is being handed over to another wireless network station on the network or while the wireless network coordinator 700 is in a busy state, the management unit 760 may set a flag indicating that transmission or reception of a request packet is limited by setting a flag in the beacon state field 521. Here, the busy state is a state in which the wireless network coordinator does not possess the resources required to respond to a request packet. The resources required to respond to a request packet may include a CPU, a memory, and network resources. Then, after the handover of the network management authority is completed, or when the wireless network coordinator 700 returns to a normal state, the management unit 760 may reset a flag in the beacon state field 521 indicating that transmission or reception of a request packet is allowed.

The communication unit 770 converts the beacon frame 500 generated by the frame generation unit 750 into a radio signal and transmits the radio signal through a predetermined communication channel. In this case, the communication unit 770 may transmit the beacon frame 500 including information regarding whether a request packet can be transmitted or received. The communication unit 770 includes a baseband processor 771 and a radio frequency (RF) unit 772, and is connected to an antenna 780. The antenna 780 may transmit or receive an omnidirectional low-frequency bandwidth radio signal. Here, a frequency bandwidth of a communication channel formed by the RF unit 772 includes 2.4 GHz or 5 GHz.

A bandwidth allocation packet includes at least one of a bandwidth allocation request packet for requesting bandwidth allocation and a bandwidth allocation approval packet for approving bandwidth allocation. That is, each wireless network station existing on a network may transmit a bandwidth allocation request packet to the wireless network coordinator 700 during a reserved period. Then, the wireless network coordinator 700 may transmit a bandwidth allocation approval packet in response to the bandwidth allocation request packet.

In order to transmit or receive a bandwidth allocation packet during a reserved period, the wireless network stations contend with one another using a CSMA/CA method or a slotted aloha method.

A wireless network station, which receives the bandwidth allocation approval packet from the wireless network coordinator 700, may transmit data through an allocated bandwidth. In this case, the data may include compressed data and uncompressed data.

The management unit 760 may set a source identifier to broadcast, which is one of the information elements of a schedule block, thereby allowing all wireless network stations on a network to contend with one another during a reserved period. Alternatively, the management unit 760 may set the source identifier to a specified wireless network station on the network, thereby allowing only the wireless network station to contend with itself during the reserved period.

Figure 8:
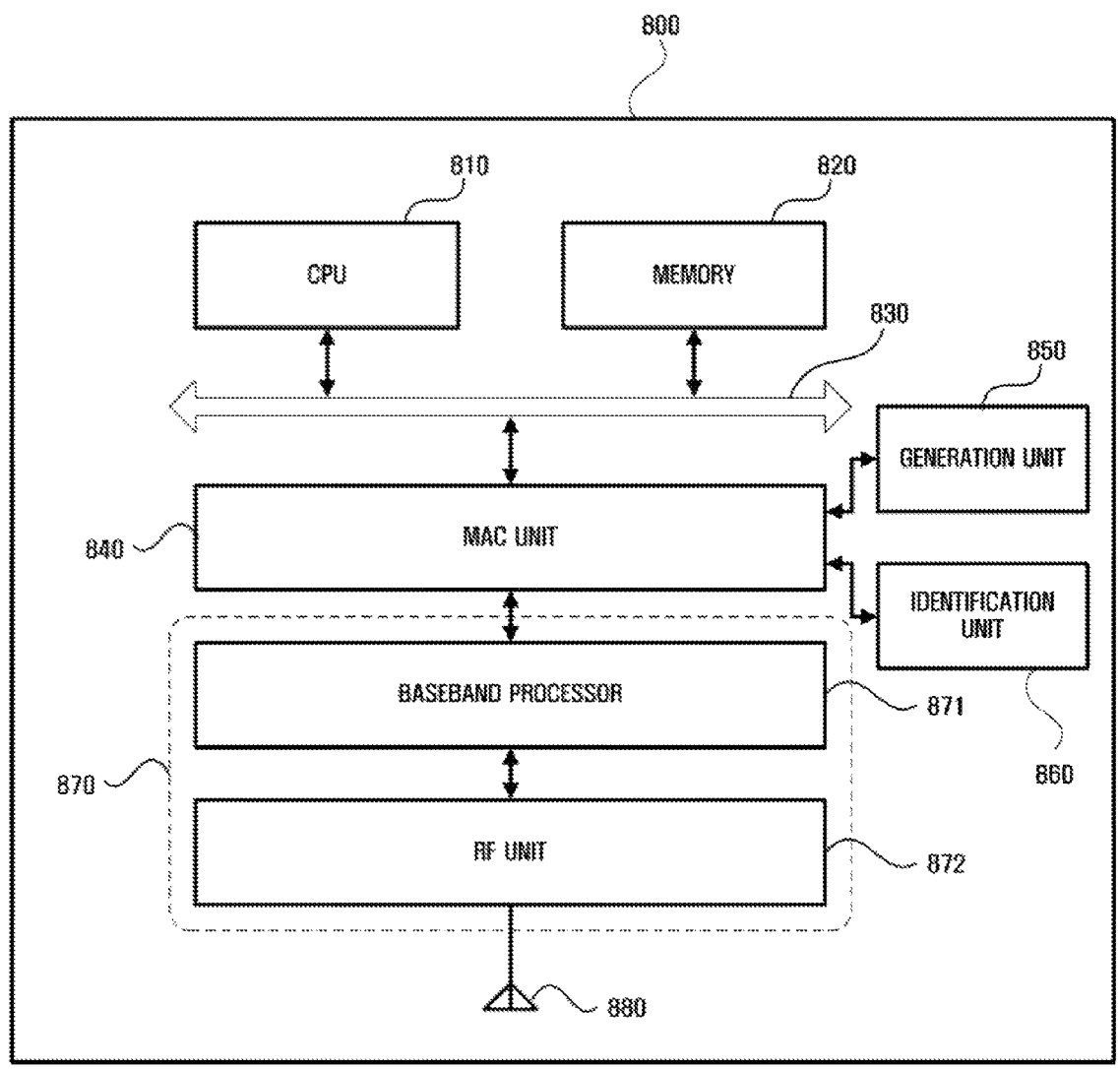
FIG. 8 is a block diagram of a wireless network station according to an exemplary embodiment of the present invention.

FIG. 8 is a block diagram of a wireless network station 800 according to an exemplary embodiment of the present invention. Referring to FIG. 8, the wireless network station 800 includes a CPU 810, a memory 820, an MAC unit 840, a generation unit 850, an identification unit 860, and a communication unit 870.

The CPU 810 controls other components connected to a bus 830 and is responsible for processing the upper layer 310 illustrated in FIG. 3. In addition, the CPU 810 processes reception data provided by (a reception MAC service data unit (MSDU)) the MAC unit 840 or generates transmission data (a transmission MSDU) and transmits the generated transmission data to the MAC unit 840.

The memory 820 is a data storage module which can input or output information, such as a compact flash (CF) card, a secure digital (SD) card, a smart media (SM) card, a multimedia card (MMC), or a memory stick. The memory 820 may be included in the wireless network station 800 or in a separate apparatus.

The generation unit 850 adds an MAC header to the transmission MSDU, i.e., the transmission data, provided by the CPU 810 and generates an MAC protocol data unit (MPDU).

The communication unit 870 converts the MPDU generated by the generation unit 850 into a radio signal and transmits the radio signal through a predetermined communication channel. To this end, the communication unit 870 includes a baseband processor 871 and a radio frequency (RF) unit 872 and is connected to an antenna 880. The antenna 880 may transmit or receive an omnidirectional low-frequency bandwidth radio signal or a directional high-frequency bandwidth radio signal.

The baseband processor 871 receives the MPDU generated by the generation unit 850, adds a signal field and a preamble to the MPDU, and generates a physical layer protocol data unit (PPDU). Then, the RF unit 872 converts the generated PPDU into a radio signal and transmits the radio signal through the antenna 880.

The wireless network station 800 may be allocated a bandwidth of a reserved CTB included in a superframe 400 or contend with other wireless network stations for the bandwidth in order to transmit data. Accordingly, the wireless network station 800 may contend with other wireless network stations for a bandwidth during a reserved period.

To this end, the communication unit 870 may receive the beacon frame 500 from the wireless network coordinator 700 and transmit the received beacon frame 500 to the identification unit 860.

The identification unit 860 identifies whether a period, i.e., a reserved period, during which a packet for bandwidth allocation of a network is transmitted or received is included in a superframe 400 by referring to the received beacon frame 500. Here, the identification unit 860 may refer to a time block number field, which is one of information elements of a schedule block, or a stream index field. That is, if a value of one is entered in the block number field or if the stream index field is set as bandwidth reservation traffic, the identification unit 860 may identify that a CTB designated by a corresponding schedule block is set as a reserved period.

Based on the identification result of the identification unit 860, the generation unit 850 generates a bandwidth allocation request packet, and the communication unit 870 transmits the generated bandwidth allocation request packet to the wireless network coordinator 700 through a predetermined communication channel. Then, the wireless network coordinator 700 transmits a bandwidth allocation approval packet in response to the bandwidth allocation request packet to the wireless network station.

A plurality of wireless network stations may exist on a network, and each wireless network station may transmit a bandwidth allocation request packet on a contention basis during a reserved period. A media access method used here may be the CSMA/CA method or the slotted aloha method.

When receiving the bandwidth allocation approval packet, the generation unit 850 of the wireless network station 800 generates data through the processes described above, and the communication unit 870 transmits the generated data in a CTB designated in the bandwidth allocation approval packet. Here, a frequency bandwidth of a communication channel through which the data is transmitted includes 60 GHz, and the data may be uncompressed data.

In FIG. 8, the generation unit 850 is implemented outside the MAC unit 840. However, the generation unit 850 may be implemented within the MAC unit 840.

With reference to the beacon frame 500, the identification unit 860 may identify whether a packet (request packet) for bandwidth use on a network can be transmitted or received. Here, the identification unit 860 may identify whether a request packet can be transmitted or received by checking a flag in the beacon state field 521 of the beacon frame 500.

The identification result of the identification unit 860 is transmitted to the MAC unit 840. If the identification result indicates that a request packet can be transmitted or received, the generation unit 850 generates a request packet according to a control command of the MAC unit 840. That is, the generation unit 850 may generate a request packet for requesting an approval for network participation or a bandwidth allocation request packet.

The request packet generated by the generation unit 850 is transmitted to the wireless network coordinator 700 through the communication unit 870 during an unreserved CTB. Here, a frequency bandwidth of a communication channel through which the request packet is transmitted includes 2.4 GHz or 5 GHz.

Among the wireless network stations existing on the network, the wireless network station 800 having a management unit (not shown) may function as the wireless network coordinator 700. That is, the wireless network station 800 generates and broadcasts the beacon frame 500, thereby allocating a reserved period to another wireless network station. In addition, the wireless network station 800 generates and transmits a bandwidth allocation approval packet, thereby allocating a bandwidth to another wireless network station selected by contention. The management unit of the wireless network station 800, which assumes a network management authority, may set and broadcast the beacon frame 500 in order to allow transmission or reception of a request packet.

Figure 9:
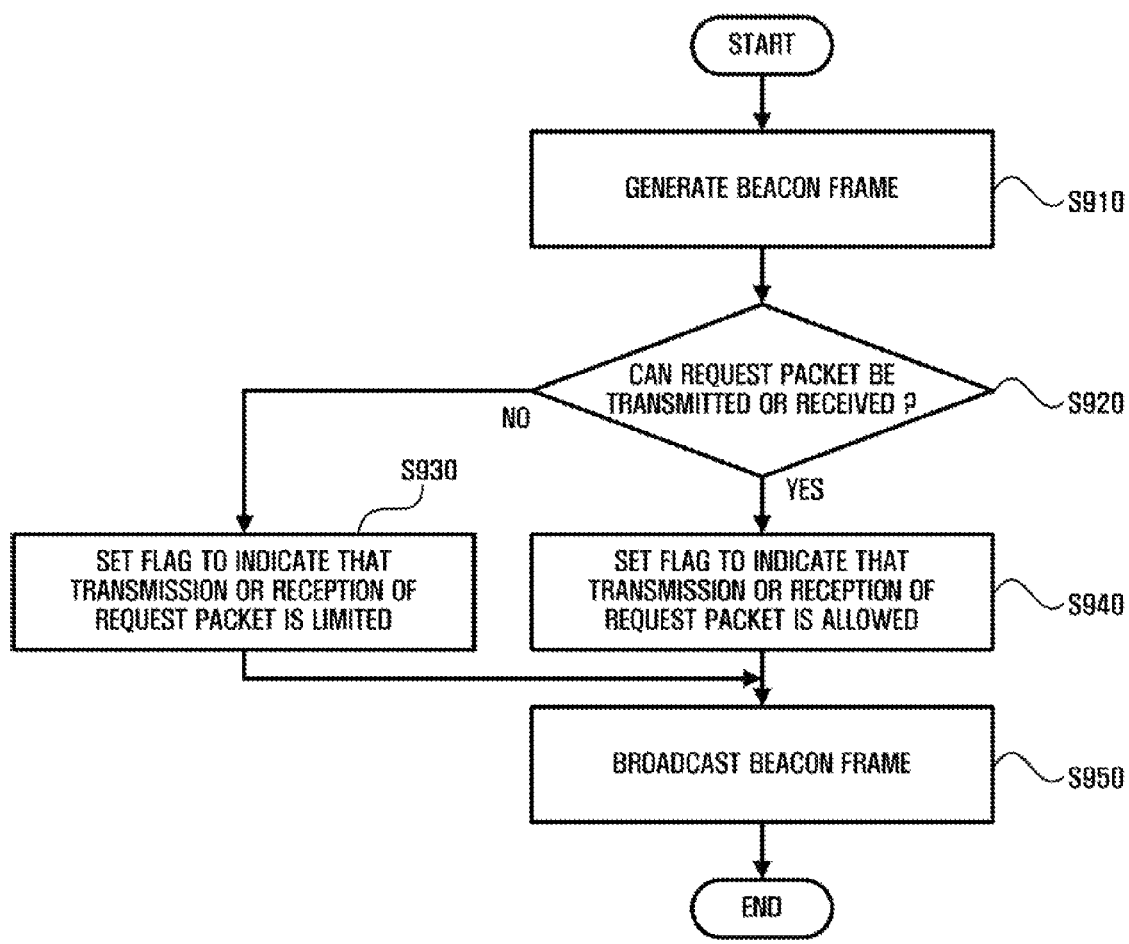
FIG. 9 is a flowchart illustrating the operation of the wireless network coordinator according to an exemplary embodiment of the present invention.

FIG. 9 is a flowchart illustrating the operation of the wireless network coordinator 700 according to an exemplary embodiment of the present invention.

Referring to FIG. 9, the frame generation unit 750 of the wireless network coordinator 700 generates a beacon frame 500 for forming a superframe 400 in order to indicate whether wireless network stations can transmit request packets (operation S910).

The management unit 760 continuously determines whether the wireless network stations can transmit request packets (operation S920) and sets a flag indicating whether the wireless network stations can transmit the request packets based on the determination result. For example, while the network management authority is being handed over to another wireless network station or while the wireless network coordinator 700 is in a busy state, the management unit 760 may set a flag indicating whether the wireless network stations can transmit the request packets. Here, the management unit 760 may indicate whether the wireless network stations can transmit the request packets by setting a predetermined flag in the beacon state field 521 of the generated beacon frame 500. If determining that the wireless network stations can transmit or receive request packets, the management unit 760 sets the flag to a value indicating that the transmission or reception of the request packets is allowed (operation S940). If determining that the wireless network stations cannot transmit or receive the request packets, the management unit 760 sets the flag to a value indicating that the transmission or reception of the request packets is limited (operation S930).

The beacon frame 500 generated by the frame generation unit 750 and updated by the management unit 760 is broadcast by the communication unit 770 (operation S950). Here, the communication unit 770 may transmit the beacon frame through a communication channel in a frequency bandwidth of 2.4 GHz or 5 GHz.

Figure 10:
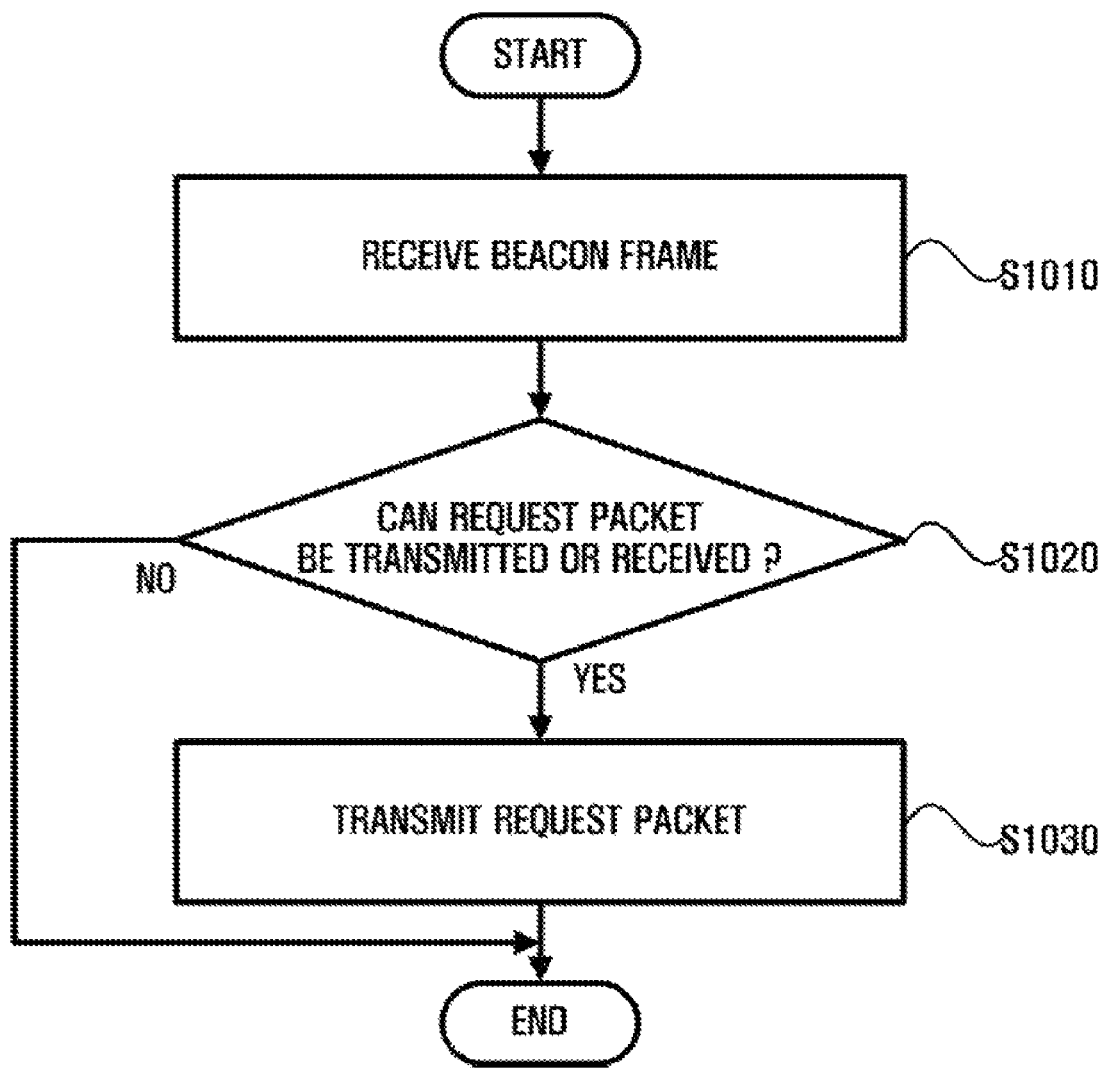
FIG. 10 is a flowchart illustrating a process of transmitting or receiving data using the wireless network station according to an exemplary embodiment of the present invention.

FIG. 10 is a flowchart illustrating a process of transmitting or receiving data using the wireless network station 800 according to an exemplary embodiment of the present invention.

In order to determine whether to transmit a request packet based on a beacon frame 500 which was broadcast by the wireless network coordinator 700 over a network, the communication unit 870 of the wireless network station 800 receives the beacon frame 500 broadcast over the network (operation S1010).

With reference to the received beacon frame, the identification unit 860 identifies whether a request packet can be transmitted or received over the network (operation S1020). To this end, the identification unit 860 may identify a flag set in the beacon state field 521 of the beacon frame 500.

The identification result of the identification unit 860 is transmitted to the MAC unit 840. If the identification result indicates that transmission or reception of the request packet is allowed, the MAC unit 840 transmits a control command to the generation unit 850 so that the generation unit 850 can generate a request packet. The generated request packet is transmitted to the wireless network coordinator 700 through the communication unit 870 (operation S1030). In this case, the communication unit 870 may transmit the request packet through a communication channel in a frequency bandwidth of 2.4 GHz or 5 GHz. On the other hand, if the identification result indicates that the transmission or reception of the request packed is not allowed, no request packet is transmitted.

As described above, a wireless network system and a method of transmitting or receiving data over a wireless network according to the present invention can prevent a loss of a communication bandwidth by limiting transmission or reception of request packets by stations existing on the wireless network, where directional communication is performed in a high-frequency bandwidth, while network management authority is being handed over from a network coordinator to a new network coordinator or while a network coordinator is in a busy state. While the present invention has been particularly shown and described with reference to exemplary embodiments thereof, it will be understood by those of ordinary skill in the art that various changes in form and detail may be made therein without departing from the spirit and scope of the present invention as defined by the following claims. As a result, the exemplary embodiments described above should only be considered in a descriptive sense and not for purposes of limitation.

What is claimed is:

1. A wireless network coordinator for managing a network, the wireless network coordinator comprising:
   a frame generation unit which generates a beacon frame for defining a superframe;
   a management unit which determines a state of the network and a wireless network station on the network, and inserts a result of the determination in the beacon frame, wherein the management unit sets a field of the beacon frame which indicates whether the wireless network coordinator can accept a command; and
   a communication unit which transmits the beacon frame,
   wherein if a network management authority is being handed over to another wireless network station on the network, the management unit sets a flag in the field to indicate a command cannot be accepted.

2. The wireless network coordinator of claim 1, wherein the command comprises at least one of:
   a command for requesting bandwidth allocation of a channel time block in the superframe; and
   a command for requesting an approval for participation in the network.

3. The wireless network coordinator of claim 1, wherein the field is a beacons state field of the beacon frame.

4. The wireless network coordinator of claim 3, wherein the beacon state field comprises an accepting commands field which indicates whether a packet which comprises a bandwidth allocation request command which is transmitted by a wireless network station on the network or a packet which comprises a command requesting an approval for participation in the network can be received.

5. The wireless network coordinator of claim 1, wherein if responding to the command is not available since the wireless network coordinator is in a busy state, the management unit sets the flag in the field to indicate that a command cannot be accepted.

6. The wireless network coordinator of claim 1, wherein the busy state is a state in which there is a lack of resources required to respond to the command.

7. The wireless network coordinator of claim 6, wherein the resources comprise at least one of central processing unit resources, memory resources, and network resources.

8. The wireless network coordinator of claim 1, wherein, if the network management authority is handed over to a wireless network station on the network, the management unit sets the flag to indicate that the command is not accepted by setting the flag in the beacon state field.

9. The wireless network coordinator of claim 1, wherein, if the network management authority is handed over from the wireless network coordinator, the management unit sets the flag to indicate that the command is accepted by setting the flag in the beacon state field.

10. A method of forming a wireless network, the method comprising:
    generating a beacon frame for defining a superframe;
    determining a state of a network and a wireless network station on the network;
    inserting a result of the determination in the beacon frame, wherein the inserting the result of the determining comprises setting a field of the beacon frame which indicates whether the wireless network coordinator can accept a command; and
    transmitting the beacon frame,
    wherein the inserting the result of the determining comprises setting a flag in the beacon state field to indicate that a command cannot be accepted, if a network management authority is being handed over to another wireless network station on the network.

11. The method of claim 10, wherein the command comprises at least one of:
    a command for requesting bandwidth allocation of a channel time block in the superframe; and
    a command for requesting an approval for participation in the network.

12. The method of claim 10, wherein the field is a beacon state field of the beacon frame.

13. The method of claim 12, wherein the beacon state field comprises an accepting commands field which indicates whether a bandwidth allocation request command which is transmitted by a wireless network station on the network or a command requesting an approval for participation in the network can be accepted.

14. The method of claim 10, wherein the inserting the result of the determining comprises setting the flag in the field to indicate that the command is not accepted, if responding to the command is not available since a wireless network coordinator is in a busy state.

15. The method of claim 10, wherein the busy state is a state in which there is a lack of resources required to respond to the command.

16. The method of claim 15, wherein the resources comprise at least one of central processing unit resources, memory resources, and network resources.

17. The method of claim 10, wherein, the inserting the result of the determining comprises setting the flag to indicate that the command is not accepted by setting the flag in the beacon state field, when the network management authority is handed over to a wireless network station on the network.

18. The method of claim 10, wherein, the inserting the result of the determining comprises setting the flag to indicate that the command is accepted by setting the flag in the beacon state field, after the network management authority is handed over from a wireless network coordinator.

* * * * *